United States Patent
Kawasaki et al.

(10) Patent No.: US 9,783,897 B2
(45) Date of Patent: Oct. 10, 2017

(54) HIGH PRESSURE WATER ELECTROLYSIS DEVICE

(71) Applicant: HONDA MOTOR CO., LTD., Tokyo (JP)

(72) Inventors: Nobuyuki Kawasaki, Wako (JP); Daisuke Kurashina, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 255 days.

(21) Appl. No.: 14/520,345

(22) Filed: Oct. 22, 2014

(65) Prior Publication Data

US 2015/0114831 A1 Apr. 30, 2015

(30) Foreign Application Priority Data

Oct. 30, 2013 (JP) ................................ 2013-224890

(51) Int. Cl.
| | |
|---|---|
| C25B 9/08 | (2006.01) |
| C25B 9/06 | (2006.01) |
| C25B 9/00 | (2006.01) |
| C25B 1/02 | (2006.01) |
| C25B 11/03 | (2006.01) |
| C25B 9/18 | (2006.01) |
| C25B 1/12 | (2006.01) |
| C25B 9/10 | (2006.01) |

(52) U.S. Cl.
CPC .............. *C25B 1/12* (2013.01); *C25B 9/10* (2013.01); *Y02E 60/366* (2013.01)

(58) Field of Classification Search
CPC .... C25B 9/08; C25B 9/06; C25B 1/02; C25B 9/00; C25B 9/18; C25B 11/03
USPC .................................................. 204/242, 253
See application file for complete search history.

(56) References Cited

FOREIGN PATENT DOCUMENTS

| JP | 2010189708 | * | 2/2010 | .............. C25B 9/04 |
|---|---|---|---|---|
| JP | 2010-189708 | | 9/2010 | |

* cited by examiner

*Primary Examiner* — Zulmariam Mendez
(74) *Attorney, Agent, or Firm* — Mori & Ward, LLP

(57) ABSTRACT

A high pressure water electrolysis device includes an electrolyte membrane, an anode power supplying body, a cathode power supplying body, an anode separator, a cathode separator, a cathode chamber, a seal member, and a protective sheet member. The protective sheet member is interposed between the electrolyte membrane and the anode power supplying body and includes a frame part and a through hole formation part. The frame part faces the seal member as a seal receiving part in a stacking direction. The through hole formation part is provided inwardly of the frame part. In the through hole formation part, a plurality of through holes are provided. The through hole formation part has the plurality of through holes from an inner side to outer side of a range that faces an anode catalyst part in the stacking direction.

10 Claims, 9 Drawing Sheets

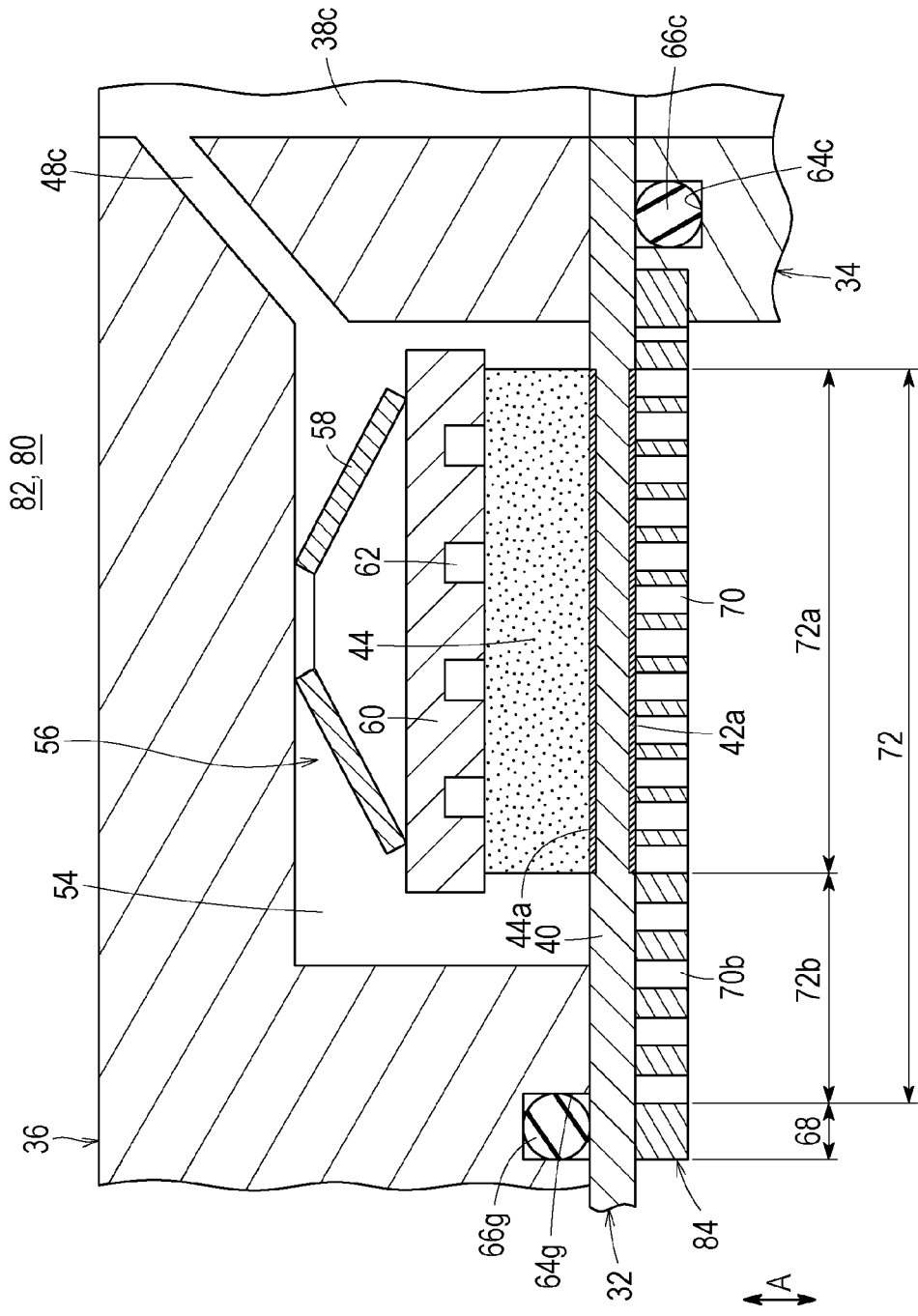

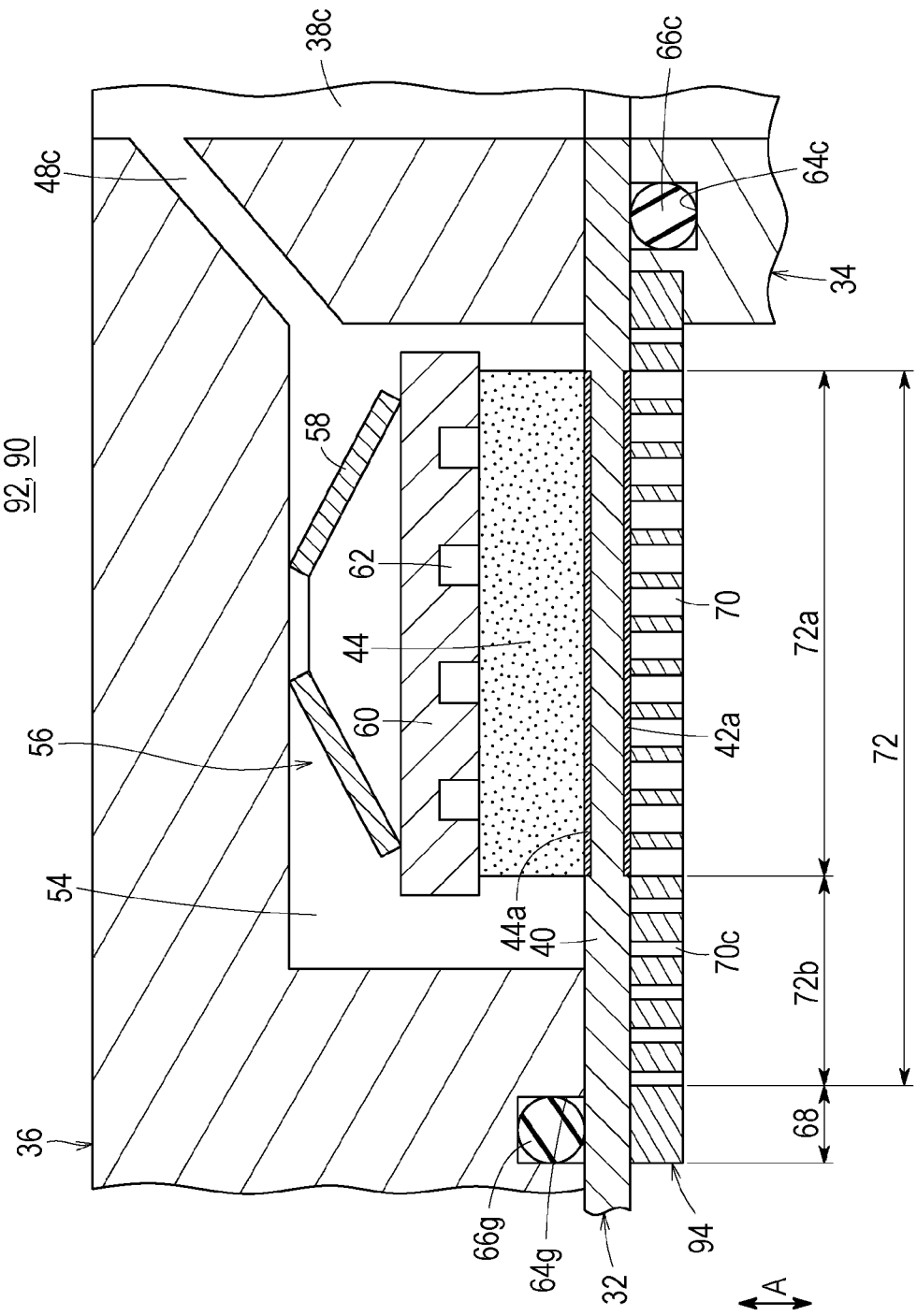

HIGH PRESSURE WATER ELECTROLYSIS DEVICE

CROSS-REFERENCE TO RELATED APPLICATIONS

The present application claims priority under 35 U.S.C. §119 to Japanese Patent Application No. 2013-224890, filed Oct. 30, 2013, entitled "High Pressure Water Electrolysis Device." The contents of this application are incorporated herein by reference in their entirety.

BACKGROUND

1. Field

The present disclosure relates to a high pressure water electrolysis device.

2. Description of the Related Art

For example, hydrogen is used as fuel gas for power generation reaction in a fuel cell. In general, a water electrolysis device is used for producing hydrogen gas. The water electrolysis device uses a solid polymer electrolyte membrane in order to generate hydrogen (and oxygen) by electrolyzing water. Electrode catalyst layers are provided on both surfaces of a solid polymer electrolyte membrane so as to form an electrolyte membrane-electrode assembly, and power supplying bodies are disposed on both sides of the electrolyte membrane-electrode assembly so as to form a unit.

Multiple units are then stacked and a voltage is applied to both ends of the units in the stacking direction, and water is supplied to anode power supplying bodies. Accordingly, on the anode side of the electrolyte membrane-electrode assembly, water is electrolyzed to generate hydrogen ions (protons), which move to the cathode side through the solid polymer electrolyte membranes and combine with electrons, thereby producing hydrogen. On the other hand, on the anode side, oxygen generated along with hydrogen is discharged from the unit with excessive water.

As the water electrolysis device, a high pressure water electrolysis device is used that produces oxygen and hydrogen which is higher in pressure than the oxygen by electrolyzing water. In the device, there is a problem in that a solid polymer electrolyte membrane is pressed against the anode power supplying body due to a differential pressure between the anode side and the cathode side, and damage such as injury may occur in the solid polymer electrolyte membrane.

For example, there is known an electrolysis device which has been disclosed in Japanese Unexamined Patent Application Publication No. 2010-189708. In the electrolysis device, a protective sheet member, in which a great number of through holes are formed, is interposed between an electrolyte membrane and a power supplying body, and the through holes each have a tapered shape with a smaller diameter toward the electrolyte membrane. Thus, it is claimed that damage of the electrolyte membrane may be prevented as much as possible with a simple configuration, and improvement in water supply performance and gas release performance may be achieved.

SUMMARY

According to one aspect of the present invention, a high pressure water electrolysis device includes an electrolyte membrane, an anode power supplying body, a cathode power supplying body, an anode separator, a cathode separator, a protective sheet member, a cathode chamber, and a seal member. The electrolyte membrane has one surface provided with an anode catalyst part and the other surface provided with a cathode catalyst part. The anode power supplying body is stacked in the anode catalyst part. The cathode power supplying body is stacked in the cathode catalyst part. The anode separator is stacked in the anode power supplying body. The cathode separator is stacked in the cathode power supplying body. The protective sheet member is interposed between the electrolyte membrane and the anode power supplying body. The cathode chamber is formed in the cathode separator and configured to house the cathode catalyst part and the cathode power supplying body and to generate high pressure hydrogen higher in pressure than oxygen generated in an anode side by electrolysis of water. The seal member is located outwardly of the cathode chamber and disposed between the electrolyte membrane and the cathode separator. The protective sheet member has a frame part that faces the seal member as a seal receiving part in a stacking direction and a through hole formation part which is provided inwardly of the frame part and in which a plurality of through holes is formed. The through hole formation part has the through holes from an inner to outer side in a range that faces the anode catalyst part in the stacking direction.

According to another aspect of the present invention, a high pressure water electrolysis device includes an electrolyte membrane, an anode power supplying body, a cathode power supplying body, an anode separator, a cathode separator, a cathode chamber, a seal member, and a protective sheet member. The electrolyte membrane has a first surface and a second surface opposite to the first surface in a stacking direction. The first surface is provided with an anode catalyst part. The second surface is provided with a cathode catalyst part. The anode power supplying body is stacked on the anode catalyst part in the stacking direction. The cathode power supplying body is stacked on the cathode catalyst part in the stacking direction. The anode separator is stacked on the anode power supplying body in the stacking direction. The cathode separator is stacked on the cathode power supplying body in the stacking direction. The cathode chamber is provided in the cathode separator to house the cathode catalyst part and the cathode power supplying body. High pressure hydrogen having a pressure higher than a pressure of oxygen generated in an anode side by electrolysis of water is to be generated in the cathode chamber. The seal member is located outwardly of the cathode chamber and disposed between the electrolyte membrane and the cathode separator. The protective sheet member is interposed between the electrolyte membrane and the anode power supplying body and includes a frame part and a through hole formation part. The frame part faces the seal member as a seal receiving part in the stacking direction. The through hole formation part is provided inwardly of the frame part. In the through hole formation part, a plurality of through holes are provided. The through hole formation part has the plurality of through holes from an inner side to outer side of a range that faces the anode catalyst part in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 8 is a cross-sectional explanatory view of the main part of a unit cell included in a high pressure water electrolysis device according to a second embodiment of the present disclosure.

FIG. 9 is a cross-sectional explanatory view of the main part of a unit cell included in a high pressure water electrolysis device according to a third embodiment of the present disclosure.

DESCRIPTION OF THE EMBODIMENTS

Figure 1:
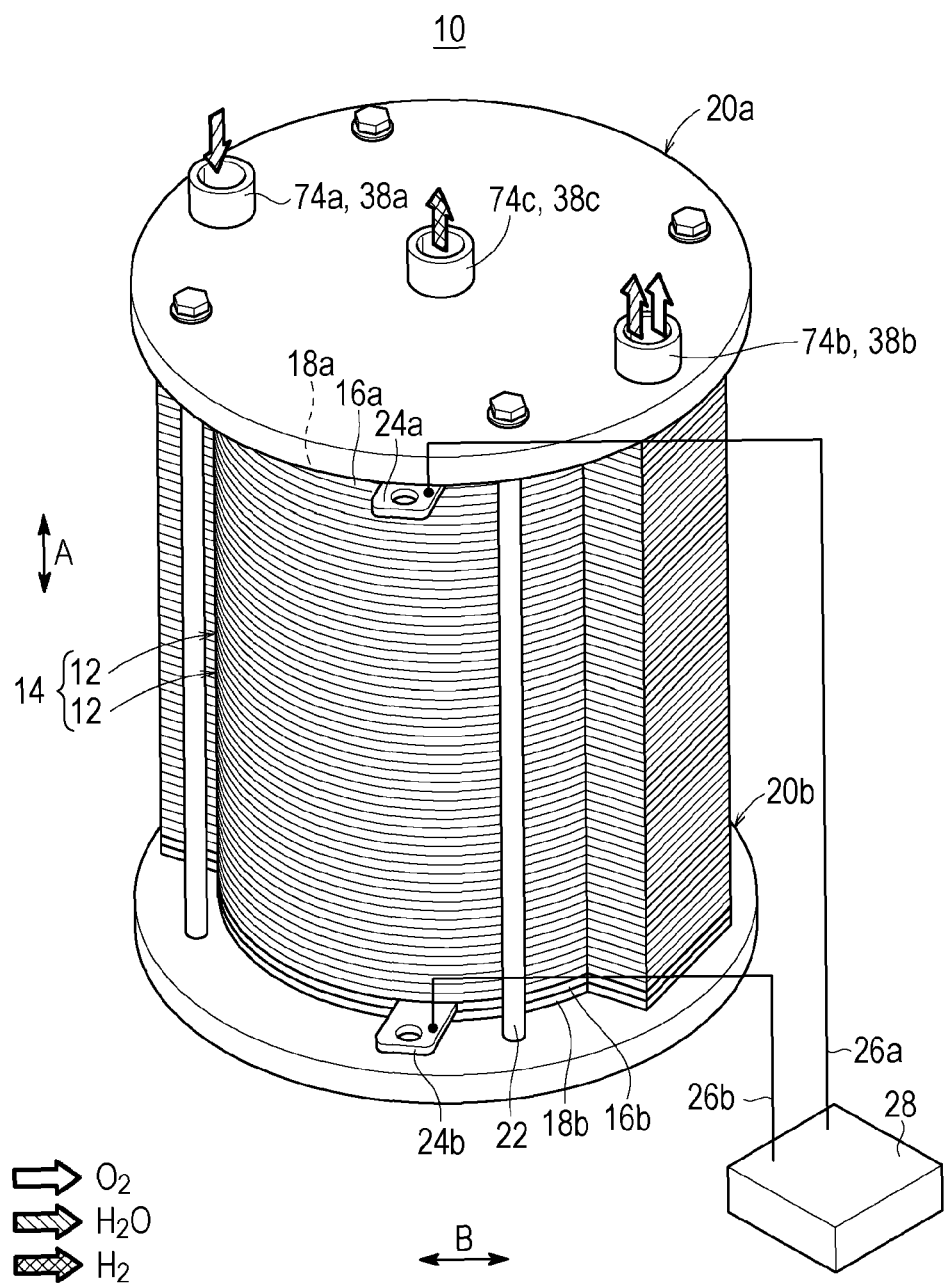
FIG. 1 is a perspective explanatory view of a high pressure water electrolysis device according to a first embodiment of the present disclosure.

The embodiments will now be described with reference to the accompanying drawings, wherein like reference numerals designate corresponding or identical elements throughout the various drawings.

As illustrated in FIG. 1, a high pressure water electrolysis device (high differential pressure water electrolysis device) 10 according to a first embodiment of the present disclosure includes a stacked layer body 14 in which a plurality of unit cells 12 is stacked in a vertical direction (direction of arrow A) or in a horizontal direction (direction of arrow B).

At one end (upper end) of the stacked layer body 14 in the stacking direction, a terminal plate 16a, an insulating plate 18a, and an end plate 20a are successively disposed upward. Similarly, at the other end (lower end) of the stacked layer body 14 in the stacking direction, a terminal plate 16b, an insulating plate 18b, and an end plate 20b are successively disposed downward.

The high pressure water electrolysis device 10 is integrally clamped and held between the end plates 20a and 20b in a disc shape, for example, by four tie rods 22 that extend in the direction of the arrow A. A configuration may be adopted in which the high pressure water electrolysis device 10 is integrally held by a box-shaped casing (not illustrated) that includes the end plates 20a, 20b as end plates. The high pressure water electrolysis device 10 has a substantially circular cylindrical shape as a whole, but may be set to have one of various shapes such as a cubic shape.

The lateral sides of the terminal plates 16a, 16b are respectively provided with terminal portions 24a, 24b that project outwardly. The terminal portions 24a, 24b are electrically connected to an electrolytic power supply 28 via wires 26a, 26b, respectively.

Figure 2:
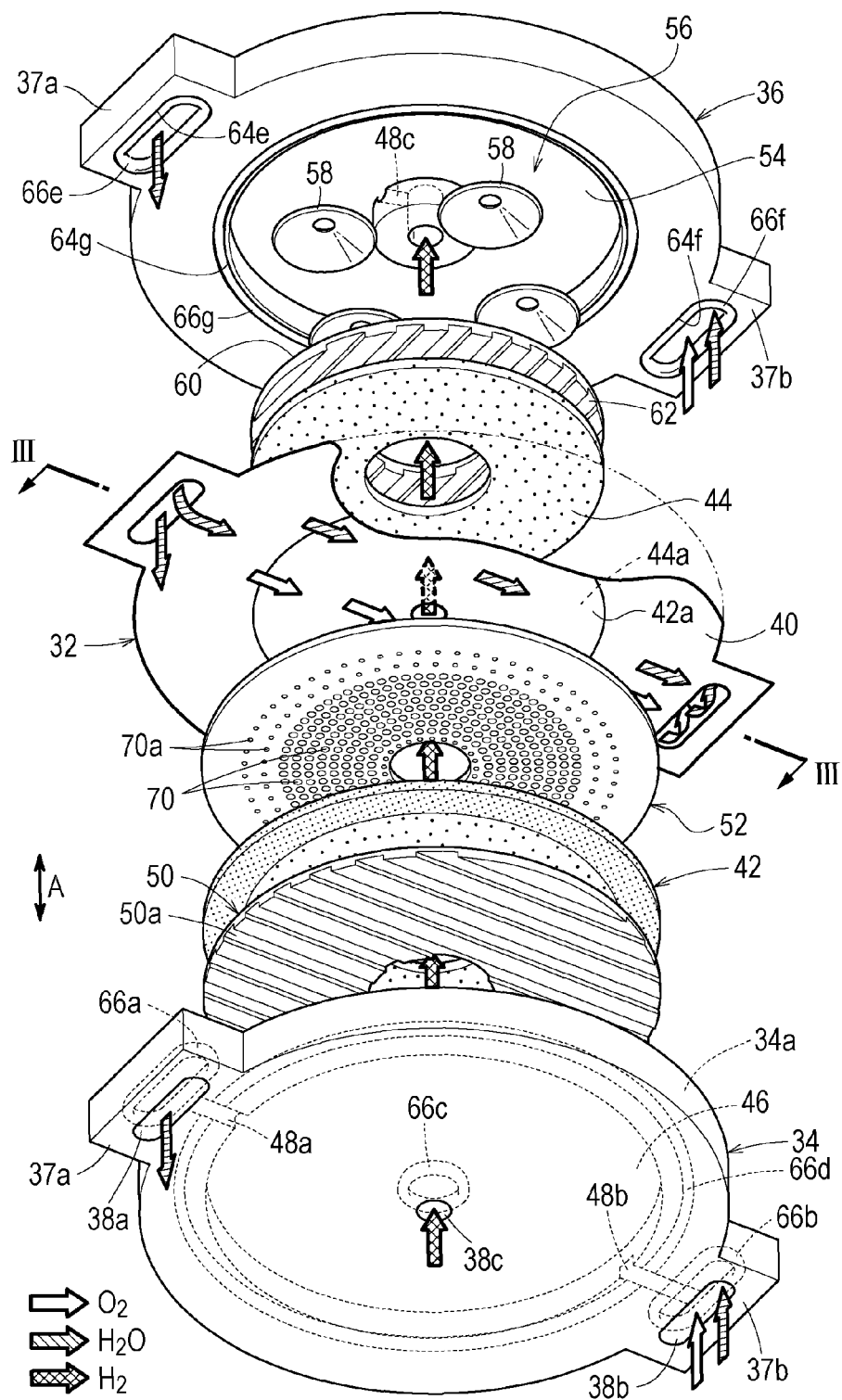
FIG. 2 is an exploded perspective explanatory view of a unit cell included in the high pressure water electrolysis device.
Figure 3:
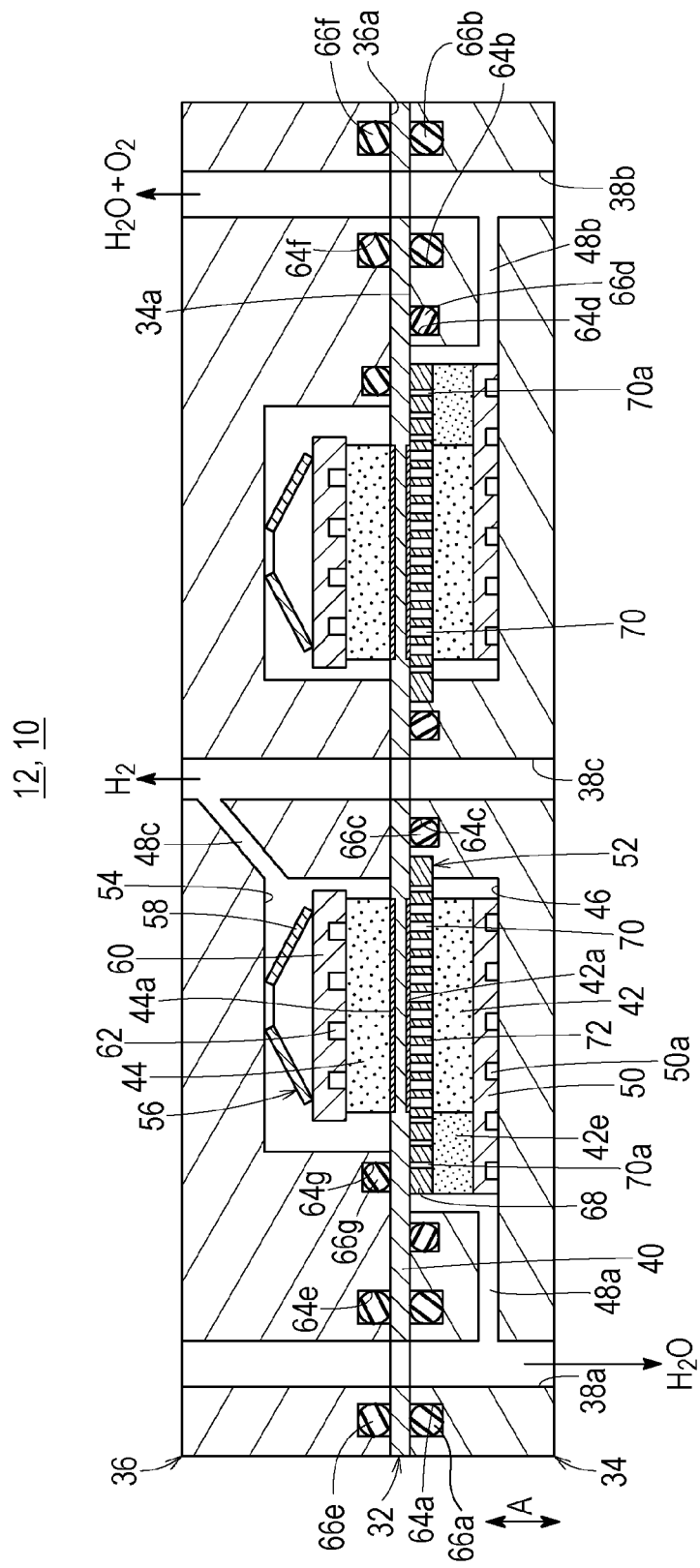
FIG. 3 is a cross-sectional view of the unit cell taken along line III-III in FIG. 2.

As illustrated in FIGS. 2 and 3, each of the unit cells 12 includes an electrolyte membrane-electrode assembly 32 in a substantially disc shape, an anode separator 34 and a cathode separator 36 between which the electrolyte membrane-electrode assembly 32 is sandwiched.

As illustrated in FIG. 2, in the outer circumferential edge of the unit cell 12, a first projection portion 37a and a second projection portion 37b are formed that project in opposite directions outwardly of the separator surfaces. The first projection portion 37a is provided with a water supply manifold 38a for supplying water (pure water), communicating with unit cells mutually in the stacking direction (direction of the arrow A). The second projection portion 37b is provided with a water discharge manifold 38b for discharging oxygen generated by a reaction and unreacted water (mixed fluid), communicating with unit cells mutually in the stacking direction.

The central portion of the unit cell 12 is provided with a high pressure hydrogen manifold 38c for discharging high pressure hydrogen (high pressure hydrogen higher in pressure than the generated oxygen) (for example, 1 to 70 MPa) generated by a reaction, the high pressure hydrogen manifold communicating with unit cells mutually in the stacking direction through substantially the center of an electrolytic area (see FIGS. 2 and 3). The high pressure hydrogen manifold 38c is not limited at the central portion of the unit cell 12 and may be provided at an end position.

The anode separator 34 and the cathode separator 36 have substantially a disc shape and are formed of a carbon member, for example. Otherwise, the anode separator 34 and the cathode separator 36 may be formed of a steel plate, a stainless steel plate, a titanium plate, an aluminum plate, a plated steel plate, or one of these metal plates which is press molded having a surface on which surface treatment for corrosion protection is made, or one of the metal plates which is cut and surface treatment for corrosion protection is made.

The electrolyte membrane-electrode assembly 32 includes a solid polymer electrolyte membrane (electrolyte membrane) 40 in substantially a ring shape. The solid polymer electrolyte membrane 40 is sandwiched between an anode power supplying body 42 and a cathode power supplying body 44 in a ring shape for electrolysis. The solid polymer electrolyte membrane 40 is formed of a hydrocarbon (HC) based membrane or a fluoride based membrane.

The high pressure hydrogen manifold 38c is formed in substantially the center portion of the solid polymer electrolyte membrane 40. One surface of the solid polymer electrolyte membrane 40 is provided with an anode electrode catalyst layer (anode catalyst part) 42a in a ring shape. The other surface of the solid polymer electrolyte membrane 40 is provided with a cathode electrode catalyst layer (cathode catalyst part) 44a in a ring shape. For example, Ru (ruthenium) based catalyst is used for the anode electrode catalyst layer 42a, and for example, platinum catalyst is used for the cathode electrode catalyst layer 44a.

The anode power supplying body 42 and the cathode power supplying body 44 are composed of, for example, a sintered body (porous conductor) of spherical atomized titanium powder. The anode power supplying body 42 and the cathode power supplying body 44 are each provided with a smooth surface part which is grinded and etched, and a porosity is set in a range of 10 to 48%, or more preferably, a range of 20 to 40%. The outer peripheral edge of the anode power supplying body 42 is provided with a frame part 42e. The frame part 42e may be integrally provided by closely forming the outer circumferential part of the anode power supplying body 42.

Figure 4:
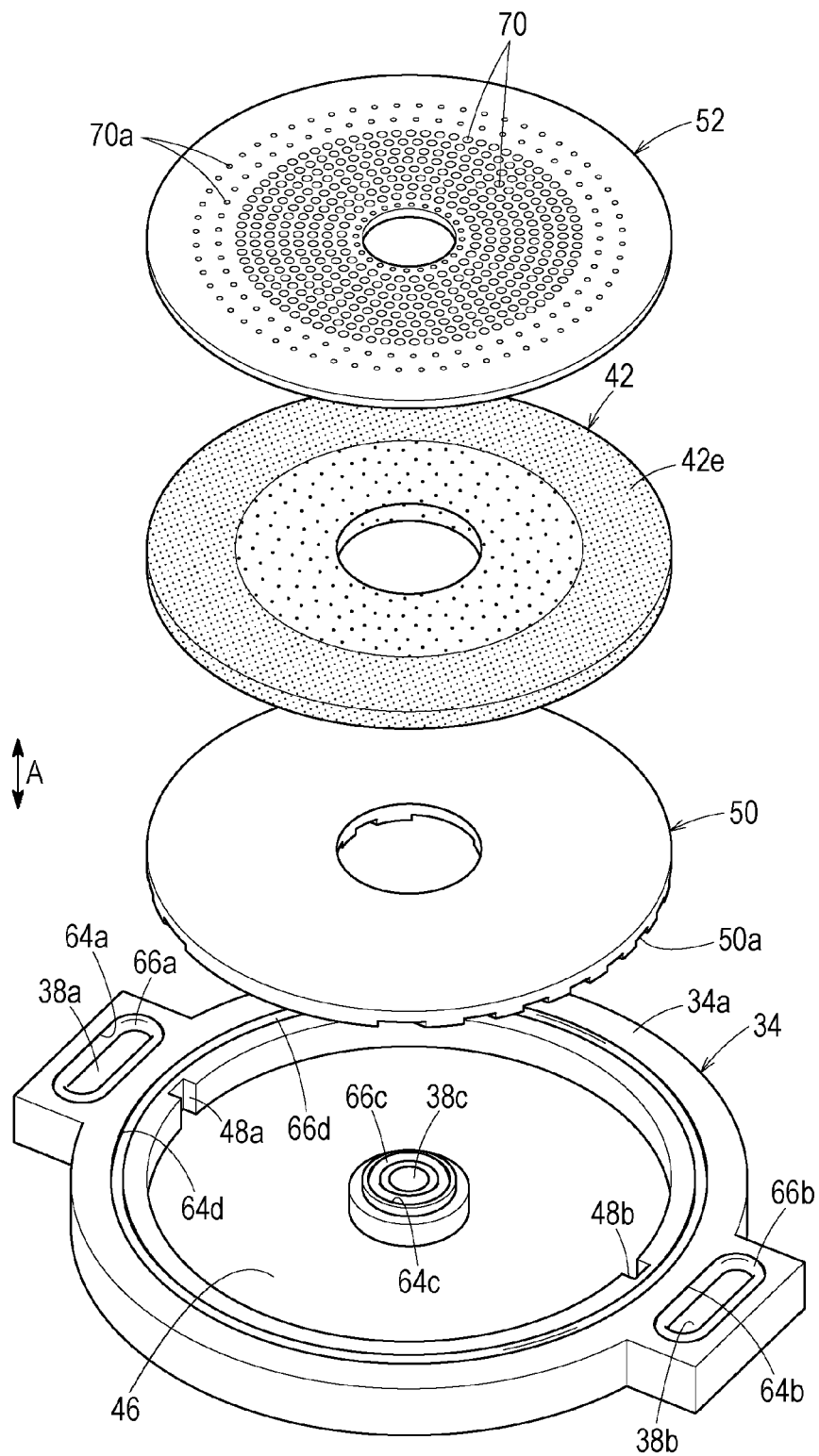
FIG. 4 is an exploded perspective explanatory view of the anode side included in the unit cell.

As illustrated in FIGS. 3 and 4, a recess in a ring shape is formed on a surface 34a of the anode separator 34 that faces the electrolyte membrane-electrode assembly 32, and thus an anode chamber 46 is formed. The anode chamber 46 communicates with a supply passage 48a and a discharge passage 48b, the supply passage communicating with the water supply manifold 38a, the discharge passage communicating with the water discharge manifold 38b.

The surface of the anode power supplying body 42 facing the bottom surface of the anode chamber 46 is provided with a water passage member 50. The water passage member 50 is provided with water passages 50a that communicate with the supply passage 48a and the discharge passage 48b. The water passages 50a are formed of multiple grooves that extend horizontally in parallel in FIG. 2.

In the anode chamber 46, the anode power supplying body 42 and a ring-shaped protective sheet member 52 are disposed, the protective sheet member being interposed between the anode power supplying body 42 and the solid polymer electrolyte membrane 40. Detailed description of the protective sheet member 52 will be described later.

As illustrated in FIGS. 2 and 3, a cathode chamber 54 is formed as a substantially ring-shaped notch on a surface 36a of the cathode separator 36 that faces the solid polymer electrolyte membrane 40. In the cathode chamber 54, the cathode power supplying body 44 and a load application mechanism 56 are disposed, the load application mechanism being configured to press the cathode power supplying body 44 against the solid polymer electrolyte membrane 40.

The load application mechanism 56 includes a coned disc spring 58 which applies a load to the cathode power supplying body 44 via a disc spring holder 60. High pressure hydrogen passages 62 are formed on the surface of the disc spring holder 60 that faces the cathode power supplying body 44. The high pressure hydrogen passages 62 have multiple grooves and communicate with the high pressure hydrogen manifold 38c from the cathode chamber 54 through a hydrogen discharge passage 48c.

As illustrated in FIGS. 2 to 4, a first seal groove 64a, which surrounds the water supply manifold 38a, is formed in the first projection portion 37a of the anode separator 34. A second seal groove 64b, which surrounds the water discharge manifold 38b, is formed in the second projection portion 37b of the anode separator 34. A first seal member 66a is disposed in the first seal groove 64a, and a second seal member 66b is disposed in the second seal groove 64b.

A third seal groove 64c, which surrounds the inner side of the anode chamber 46, is formed on the surface 34a, and a third seal member 66c is disposed in the third seal groove 64c. A fourth seal groove 64d, which surrounds the outer side of the anode chamber 46, is formed on the surface 34a, and a fourth seal member 66d is disposed in the fourth seal groove 64d.

As illustrated in FIGS. 2 and 3, a fifth seal groove 64e, which surrounds the water supply manifold 38a, is formed in the first projection portion 37a of the cathode separator 36. A sixth seal groove 64f, which surrounds the water discharge manifold 38b, is formed in the second projection portion 37b of the cathode separator 36. A fifth seal member 66e is disposed in the fifth seal groove 64e, and a sixth seal member 66f is disposed in the sixth seal groove 64f. A seventh seal groove 64g, which is located outwardly of the cathode chamber 54, is formed on the surface 36a of the cathode separator 36. A seventh seal member (seal member in the present embodiment) 66g is disposed in the seventh seal groove 64g.

For the first to seventh seal members 66a to 66g, a seal member having elasticity is used like a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber.

Figure 5:
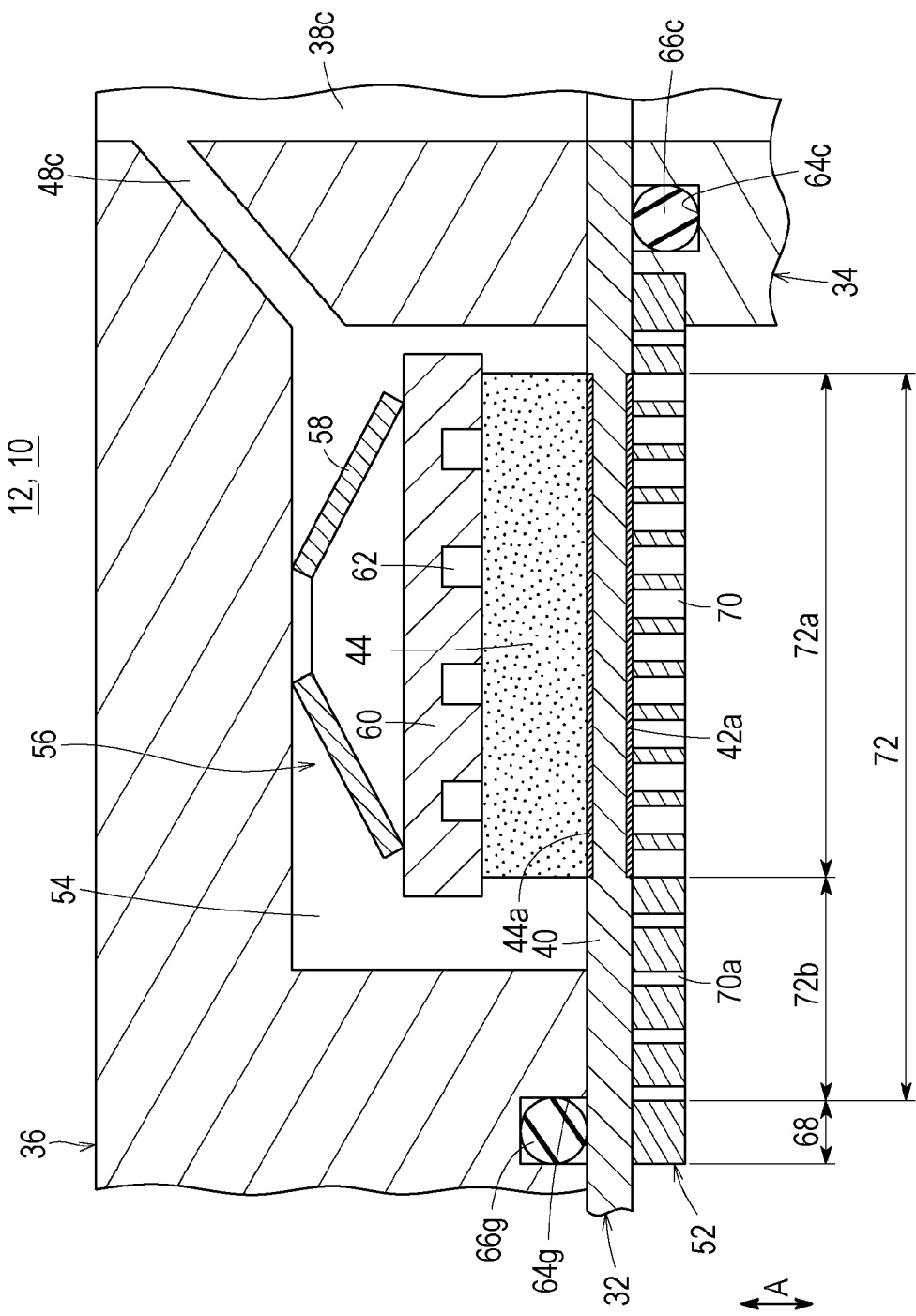
FIG. 5 is a cross-sectional explanatory view of the main part of the unit cell.

The protective sheet member 52 has an inner circumferential position which is located inwardly of the inner circumferential position of the anode power supplying body 42 and the cathode power supplying body 44, and has an outer circumferential position which extends the vicinity of the outer circumferential position of the seventh seal groove 64g. As illustrated in FIG. 5, the protective sheet member 52 has a frame part 68 that faces the seventh seal member 66g as a seal receiving part, and a through hole formation part 72 which is provided inwardly of the frame part 68 and in which a plurality of through holes 70, 70a is formed. The through hole formation part 72 has the through holes 70, 70a from the inner to outer side in a range that faces the anode electrode catalyst layer 42a in the stacking direction (direction of the arrow A).

In the first embodiment, the through hole formation part 72 has a catalyst range part 72a provided in a range that faces the anode electrode catalyst layer 42a in the stacking direction, and a peripheral part 72b which is located outwardly of the catalyst range part 72a and provided in a range that faces at least the cathode chamber 54 in the stacking direction. The peripheral part 72b is disposed partially overlapped with the seventh seal groove 64g that houses the seventh seal member 66g, and the outermost circumferential through holes 70a are set at positions that faces the seventh seal groove 64g in the stacking direction.

The arrangement density of the through holes 70 formed in the catalyst range part 72a is higher than the arrangement density of the through holes 70a which are formed in the peripheral part 72b. In addition, the opening diameter of the through holes 70 formed in the catalyst range part 72a is larger than the opening diameter of the through holes 70a which are formed in the peripheral part 72b.

As illustrated in FIG. 1, the end plate 20a is connected to pipes 74a, 74b, and 74c that communicate with the water supply manifold 38a, the water discharge manifold 38b, and the high pressure hydrogen manifold 38c, respectively. Although not illustrated, the pipe 74c is provided with a back pressure valve (or an electromagnetic valve) and capable of maintaining the pressure of the hydrogen generated in the high pressure hydrogen manifold 38c at a high pressure.

The operation of the high pressure water electrolysis device 10 configured in this manner will be described in the following.

As illustrated in FIG. 1, water is supplied to the water supply manifold 38a of the high pressure water electrolysis device 10 through the pipe 74a, and a voltage is applied by the electrolytic power supply 28 which is electrically connected to the terminal portions 24a, 24b of the terminal plates 16a, 16b. Thus, as illustrated in FIG. 3, in each unit cell 12, water is supplied to the water passages 50a of the anode separator 34 from the water supply manifold 38a, and the water moves along the anode power supplying body 42.

Consequently, water is electrolyzed by the anode electrode catalyst layer 42a to generate hydrogen ions, electrons, and oxygen. The hydrogen ions generated by the anodic reaction pass through the solid polymer electrolyte membrane 40, move to the cathode electrode catalyst layer 44a, and combine with electrons, thereby producing hydrogen.

Thus, hydrogen flows along the hydrogen passages within the cathode power supplying body 44, and flows through the high pressure hydrogen manifold 38c with a pressure maintained higher than the pressure in the water supply manifold 38a, and may be lead outside the high pressure water electrolysis device 10. On the other hand, the oxygen generated by a reaction and unreacted water are discharged to the outside of the high pressure water electrolysis device 10 along the water discharge manifold 38*b*.

In this case, in the first embodiment, the protective sheet member 52 has the through hole formation part 72 in which a plurality of through holes 70, 70*a* is formed as illustrated in FIGS. 3 and 5. The through hole formation part 72 has the through holes 70*a* from the inner to outer side in a range that faces the anode electrode catalyst layer 42*a* in the stacking direction. For this reason, when manufacture of high pressure hydrogen (for example, 1 to 70 MPa) is stopped and the cathode chamber 54 is depressurized, high pressure hydrogen dissolved in the solid polymer electrolyte membrane 40 may easily and smoothly move to the anode chamber 46 through the through holes 70*a*.

Figure 6:
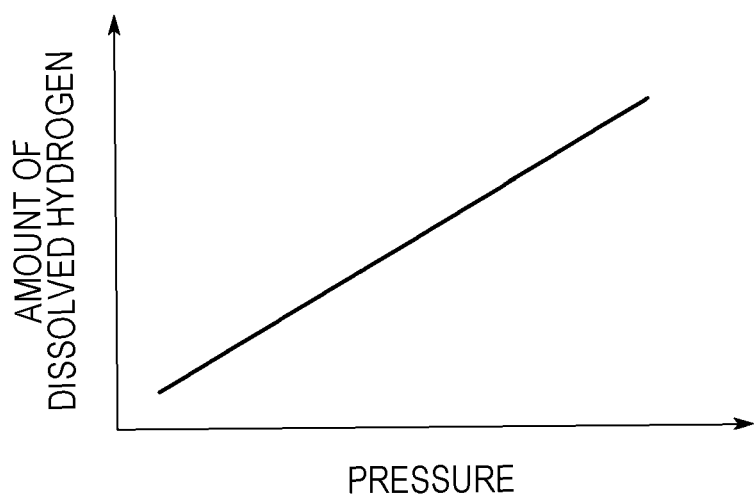
FIG. 6 is an explanatory graph of the relationship between hydrogen pressure and amount of dissolved hydrogen in a solid polymer electrolyte membrane.
Figure 7:
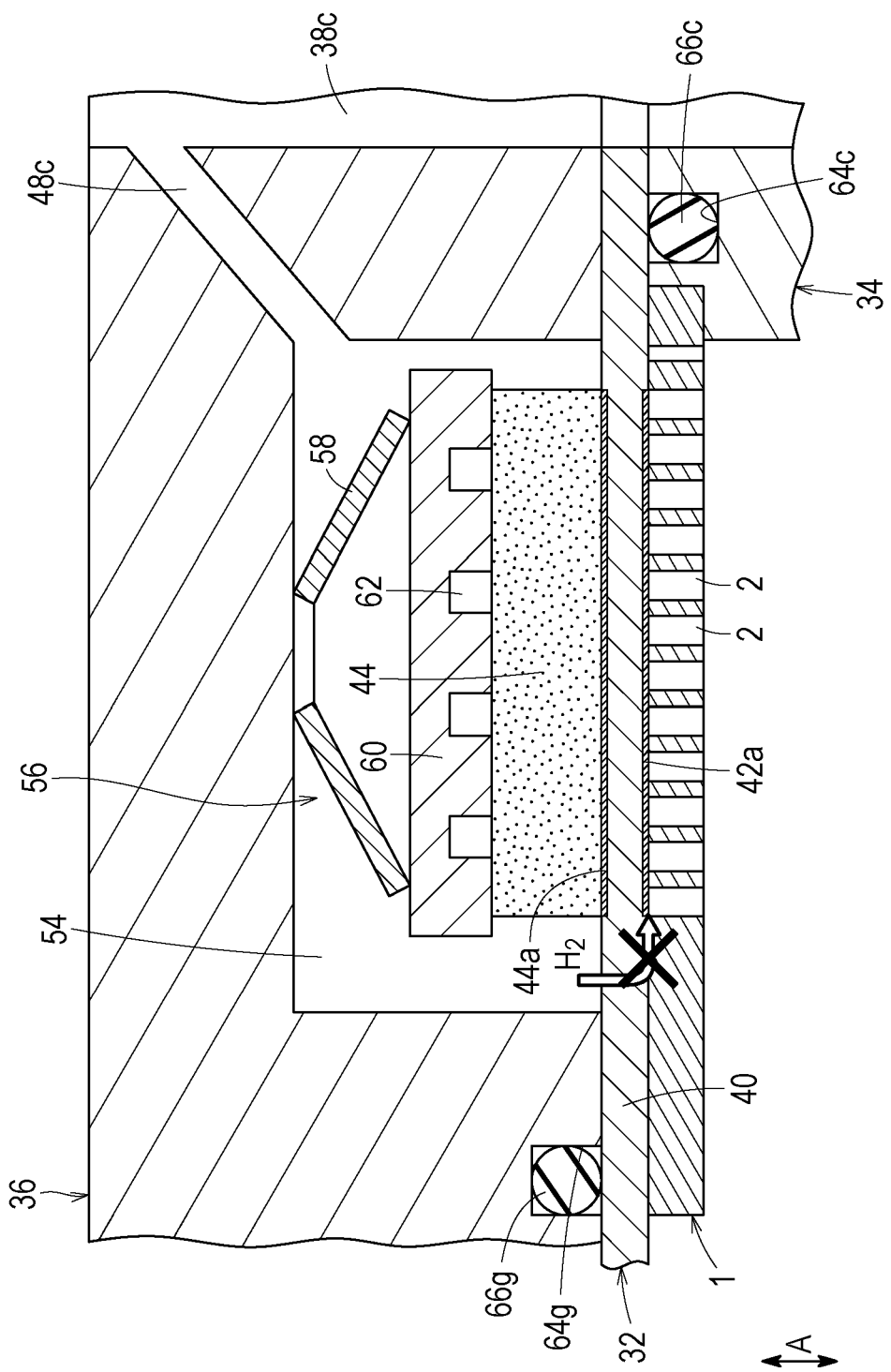
FIG. 7 is a cross-sectional explanatory view of the main part of a unit cell in a comparative example.

As illustrated in FIG. 6, in the solid polymer electrolyte membrane 40, the amount of dissolved hydrogen increases as the hydrogen pressure increases. Therefore, when through holes 2 are formed only in a range of the protective sheet member 1, which faces the anode electrode catalyst layer 42*a* as illustrated in FIG. 7, the solid polymer electrolyte membrane 40 is made to come into intimate contact with the protective sheet member 1. For this reason, when the cathode side is depressurized (decompressed), it is difficult for the hydrogen dissolved in the solid polymer electrolyte membrane 40 to escape from the solid polymer electrolyte membrane 40.

On the other hand, in the first embodiment, the through holes 70*a* are also provided outwardly of the range that faces the anode electrode catalyst layer 42*a*, and thus the hydrogen dissolved in the solid polymer electrolyte membrane 40 may be smoothly released through the through holes 70*a*. Consequently, it is possible to reliably prevent occurrence of blister in the solid polymer electrolyte membrane 40.

Therefore, high pressure hydrogen dissolved in the solid polymer electrolyte membrane 40 may be easily and smoothly discharged at the time of depressurization with a simple configuration, and the durability of the solid polymer electrolyte membrane 40 may be improved. Furthermore, because occurrence of blister is prevented, a depressurization rate may be increased. Consequently, the effect is obtained that it is possible to reduce a depressurization time of the high pressure water electrolysis device 10 and the operation efficiency is favorably improved.

In addition, in the first embodiment, for the through holes 70, the opening diameter is set based on the differential pressure holding performance and electrolysis performance of the solid polymer electrolyte membrane 40. On the other hand, for the through holes 70*a*, a minimum opening ratio obtained based on release characteristics of hydrogen gas, that is, the opening diameter and the interval are set.

Specifically, the arrangement density of the through holes 70 formed in the catalyst range part 72*a* is set to be higher than the arrangement density of the through holes 70*a* which are formed in the peripheral part 72*b*. In addition, the opening diameter of the through holes 70 formed in the catalyst range part 72*a* is set to be larger than the opening diameter of the through holes 70*a* which are formed in the peripheral part 72*b*. For this reason, the effect is obtained that a desired gas release characteristics is maintained and damage to the solid polymer electrolyte membrane 40 may be prevented as much as possible.

FIG. 8 is a cross-sectional explanatory view of the main part of a unit cell 82 included in a high pressure water electrolysis device 80 according to a second embodiment of the present disclosure. The same components as those of the high pressure water electrolysis device 10 according to the first embodiment are denoted by the same reference symbols and a detailed description thereof is omitted. Similarly, in a third embodiment described below, a detailed description thereof is omitted.

The unit cell 82 includes a ring-shaped protective sheet member 84 which is interposed between the anode power supplying body 42 and the solid polymer electrolyte membrane 40. In the protective sheet member 84, the peripheral part 72*b* is provided with a plurality of through holes 70*b*, and the opening diameter of the through holes 70*b* is set to be the same as the opening diameter of the through holes 70 which are formed in the catalyst range part 72*a*. The arrangement density of the through holes 70 formed in the catalyst range part 72*a* is set to be higher than the arrangement density of the through holes 70*b* which are formed in the peripheral part 72*b*.

In the second embodiment configured in this manner, the arrangement density of the through holes 70*b* is set to be lower than the arrangement density of the through holes 70, and thus bending of the solid polymer electrolyte membrane 40 due to the through holes 70*b* may be reduced. Therefore, the effect is obtained that damage to the solid polymer electrolyte membrane 40 is effectively reduced and dissolved hydrogen is smoothly released.

FIG. 9 is a cross-sectional explanatory view of the main part of a unit cell 92 included in a high pressure water electrolysis device 90 according to the third embodiment of the present disclosure.

The unit cell 92 includes a ring-shaped protective sheet member 94 which is interposed between the anode power supplying body 42 and the solid polymer electrolyte membrane 40. In the protective sheet member 94, the peripheral part 72*b* is provided with a plurality of through holes 70*c*, and the opening diameter of the through holes 70*c* is set to be smaller than the opening diameter of the through holes 70 which are formed in the catalyst range part 72*a*. The arrangement density of the through holes 70 formed in the catalyst range part 72*a* is set to be the same as the arrangement density of the through holes 70*c* which are formed in the peripheral part 72*b*.

In the third embodiment configured in this manner, the opening diameter of the through holes 70*c* is set to be smaller than the opening diameter of the through holes 70, and thus bending of the solid polymer electrolyte membrane 40 due to the through holes 70*c* may be reduced. Therefore, the effect is obtained that damage to the solid polymer electrolyte membrane 40 is effectively reduced and dissolved hydrogen is smoothly released.

A high pressure water electrolysis device according to the present disclosure has an electrolyte membrane having one surface provided with an anode catalyst part and the other surface provided with a cathode catalyst part. An anode power supplying body is stacked on the anode catalyst part, and a cathode power supplying body is stacked on the cathode catalyst part. An anode separator is stacked on the anode power supplying body and a cathode separator is stacked on the cathode power supplying body. A protective sheet member is interposed between the electrolyte membrane and the anode power supplying body.

In the cathode separator, there is formed a cathode chamber to house the cathode catalyst part and the cathode power supplying body and to generate high pressure hydrogen higher in pressure than oxygen generated in the anode side by electrolysis of water. A seal member, which is located outwardly of the cathode chamber, is disposed between the electrolyte membrane and the cathode separator.

In the high pressure water electrolysis device, the protective sheet member has a frame part that faces the seal member as a seal receiving part in a stacking direction, and a through hole formation part which is provided inwardly of the frame part and in which a plurality of through holes is formed. The through hole formation part has the through holes from an inner to outer side in a range that faces the anode catalyst part in the stacking direction. Thus, when the cathode chamber is depressurized, high pressure hydrogen dissolved in the electrolyte membrane may easily and smoothly move to the anode side through the through holes. Therefore, blister does not occur in the electrolyte membrane, and high pressure hydrogen dissolved in the electrolyte membrane may be easily and reliably discharged at the time of depressurization with a simple configuration, and the durability of the electrolyte membrane may be improved. Furthermore, because occurrence of blister is prevented, a depressurization rate may be increased. Consequently, it is possible to reduce a depressurization time and the operation efficiency is favorably improved.

In the high pressure water electrolysis device, it is preferable that the through hole formation part has a catalyst range part provided in a range that faces the anode catalyst part in the stacking direction, and a peripheral part which is located outwardly of the catalyst range part and provided in a range that faces at least the cathode chamber in the stacking direction. In the above situation, it is preferable that the arrangement density of the through holes which are formed in the catalyst range part is higher than the arrangement density of the through holes which are formed in the peripheral part.

In the high pressure water electrolysis device, it is preferable that the through hole formation part has a catalyst range part provided in a range that faces the anode catalyst part in the stacking direction, and a peripheral part which is located outwardly of the catalyst range part and provided in a range that faces at least the cathode chamber in the stacking direction. In the above situation, it is preferable that the opening diameter of the through holes which are formed in the catalyst range part is larger than the opening diameter of the through holes which are formed in the peripheral part.

Obviously, numerous modifications and variations of the present invention are possible in light of the above teachings. It is therefore to be understood that within the scope of the appended claims, the invention may be practiced otherwise than as specifically described herein.

What is claimed is:

1. A high pressure water electrolysis device comprising:
   an electrolyte membrane having one surface provided with an anode catalyst part and the other surface provided with a cathode catalyst part;
   an anode power supplying body stacked in the anode catalyst part and a cathode power supplying body stacked in the cathode catalyst part;
   an anode separator stacked in the anode power supplying body and a cathode separator stacked in the cathode power supplying body;
   a protective sheet member interposed between the electrolyte membrane and the anode power supplying body;
   a cathode chamber formed in the cathode separator and configured to house the cathode catalyst part and the cathode power supplying body and to generate high pressure hydrogen higher in pressure than oxygen generated in an anode side by electrolysis of water; and
   a seal member located outwardly of the cathode chamber and disposed between the electrolyte membrane and the cathode separator,
   wherein the protective sheet member has
      a frame part that faces the seal member as a seal receiving part in a stacking direction, and
      a through hole formation part which is provided inwardly of the frame part and in which a plurality of through holes is formed,
   wherein the through hole formation part has the through holes from an inner to outer side in a range that faces the anode catalyst part in the stacking direction,
   wherein the through hole formation part has a first part and a peripheral part which is located outwardly of the first part in a direction orthogonal to the stacking direction, and
   wherein an arrangement density of the through holes formed in the first part is higher than an arrangement density of the through holes which are formed in the peripheral part.

2. The high pressure water electrolysis device according to claim 1,
   wherein the first part is a catalyst range part provided in a range that faces the anode catalyst part in the stacking direction, and
   wherein the peripheral part is provided in a range that faces at least the cathode chamber in the stacking direction.

3. The high pressure water electrolysis device according to claim 1,
   wherein
   an opening diameter of the through holes formed in the first part is larger than an opening diameter of the through holes which are formed in the peripheral part.

4. A high pressure water electrolysis device comprising:
   an electrolyte membrane having a first surface and a second surface opposite to the first surface in a stacking direction, the first surface being provided with an anode catalyst part, the second surface being provided with a cathode catalyst part;
   an anode power supplying body stacked on the anode catalyst part in the stacking direction;
   a cathode power supplying body stacked on the cathode catalyst part in the stacking direction;
   an anode separator stacked on the anode power supplying body in the stacking direction;
   a cathode separator stacked on the cathode power supplying body in the stacking direction;
   a cathode chamber provided in the cathode separator to house the cathode catalyst part and the cathode power supplying body, high pressure hydrogen having a pressure higher than a pressure of oxygen generated in an anode side by electrolysis of water being to be generated in the cathode chamber;
   a seal member located outwardly of the cathode chamber and disposed between the electrolyte membrane and the cathode separator; and
   a protective sheet member interposed between the electrolyte membrane and the anode power supplying body and comprising:
      a frame part facing the seal member as a seal receiving part in the stacking direction; and
      a through hole formation part which is provided inwardly of the frame part and in which a plurality of through holes are provided, the through hole formation part having the plurality of through holes from an inner side to outer side of a range that faces the anode catalyst part in the stacking direction, wherein the through hole formation part has a first part and a peripheral part which is located outwardly of the first part in a direction orthogonal to the stacking direction, and wherein an arrangement density of the plurality of through holes provided in the first part is higher than an arrangement density of the plurality of through holes which are provided in the peripheral part.

5. The high pressure water electrolysis device according to claim 4, wherein the first part is a catalyst range part provided in a range that faces the anode catalyst part in the stacking direction and the peripheral part is provided in a range that faces at least the cathode chamber in the stacking direction.

6. The high pressure water electrolysis device according to claim 4, wherein the first part is a catalyst range part provided in a range that faces the anode catalyst part in the stacking direction, and the peripheral part is provided in a range that faces at least the cathode chamber in the stacking direction, and wherein an opening diameter of the plurality of through holes provided in the catalyst range part is larger than an opening diameter of the plurality of through holes which are provided in the peripheral part.

7. The high pressure water electrolysis device according to claim 4, wherein an opening diameter of the plurality of through holes provided in the first part is larger than an opening diameter of the plurality of through holes which are provided in the peripheral part.

8. The high pressure water electrolysis device according to claim 4, wherein the first part is a catalyst range part provided in a range that faces the anode catalyst part in the stacking direction and the peripheral part is provided in a range that faces at least the cathode chamber in the stacking direction, and wherein an opening diameter of the plurality of through holes provided in the catalyst range part is equal to an opening diameter of the plurality of through holes which are provided in the peripheral part.

9. The high pressure water electrolysis device according to claim 2, wherein an opening diameter of the through holes formed in the catalyst range part is larger than an opening diameter of the through holes which are formed in the peripheral part.

10. The high pressure water electrolysis device according to claim 4, wherein an opening diameter of the plurality of through holes provided in the first part is equal to an opening diameter of the plurality of through holes which are provided in the peripheral part.

* * * * *